United States Patent [19]
Bazin et al.

[11] Patent Number: 5,743,209
[45] Date of Patent: Apr. 28, 1998

[54] SYSTEM AND METHOD FOR MONITORING AND CONTROLLING MILK PRODUCTION AT DAIRY FARMS

[75] Inventors: Serge Bazin, Paris; Andre Bechu, Saint Pierre des Landes, both of France

[73] Assignee: La Federation Francaise De Controle Laitier (F.F.C.L.), Paris, France

[21] Appl. No.: 624,422

[22] PCT Filed: Aug. 1, 1994

[86] PCT No.: PCT/IB95/00679

§ 371 Date: Apr. 25, 1996

§ 102(e) Date: Apr. 25, 1996

[87] PCT Pub. No.: WO96/03859

PCT Pub. Date: Feb. 15, 1996

[30] Foreign Application Priority Data

Aug. 1, 1994 [EP] European Pat. Off. ............ 94490036

[51] Int. Cl.$^6$ ........................................ A01J 7/00
[52] U.S. Cl. ........................................ 119/14.08
[58] Field of Search ............... 119/14.01, 14.02, 119/14.03, 14.08, 14.14, 14.15, 14.16, 14.17

[56] References Cited

U.S. PATENT DOCUMENTS

| | | | |
|---|---|---|---|
| 3,841,756 | 10/1974 | Grochowicz | 119/14.03 |
| 4,537,150 | 8/1985 | Bowers | 119/14.17 |
| 5,042,428 | 8/1991 | Van der Lely et al. | 119/14.08 |
| 5,069,160 | 12/1991 | Street et al. | 119/14.08 |

FOREIGN PATENT DOCUMENTS

| | | |
|---|---|---|
| 0440313 | 8/1991 | European Pat. Off. |
| 0551959 | 7/1993 | European Pat. Off. |
| 0555895 | 8/1993 | European Pat. Off. |
| 0564023 | 10/1993 | European Pat. Off. |
| 8602505 | 5/1988 | Netherlands |

Primary Examiner—Thomas Price
Attorney, Agent, or Firm—Parkhurst, Wendel & Burr, L.L.P.

[57] ABSTRACT

An automated modular system for officially controlling the quantity and quality of milk production at a dairy farm site, including the steps of:

assigning each dairy herd an identification code; assigning each milk producing animal in each herd a unique animal identification code;

providing measuring quantitative milk production from an individual animal using a milk flow meter temporarily connectable with a milking machine for an individual animal, which milk flow meter is capable of continuously weighing milk produced per unit time by an individual animal during a single milking session;

providing qualitative analysis of the composition of a sample of milk from an individual dairy animal, which includes an infra-red optical probe;

providing system control and memory connected to the milk flow meter and to the qualitative analysis;

entering a dairy herd code into the system control and thereby initiating control of the herd and accessing stored data for herd and each individual dairy animal therein;

entering an individual dairy animal identification code in the system control when the corresponding individual dairy animal is present at the milking machine, thereby activating the milk flow meter;

measuring quantitative milk production from the individual dairy animal;

qualitatively analyzing a sample of milk from the individual dairy animal;

detecting completion of milking session as indicated by milk flow meter, and storing in the system memory data from the milking session.

23 Claims, 8 Drawing Sheets

FULLY AUTOMATED SYSTEM

FULLY AUTOMATED SYSTEM

SEMI-AUTOMATED SYSTEM

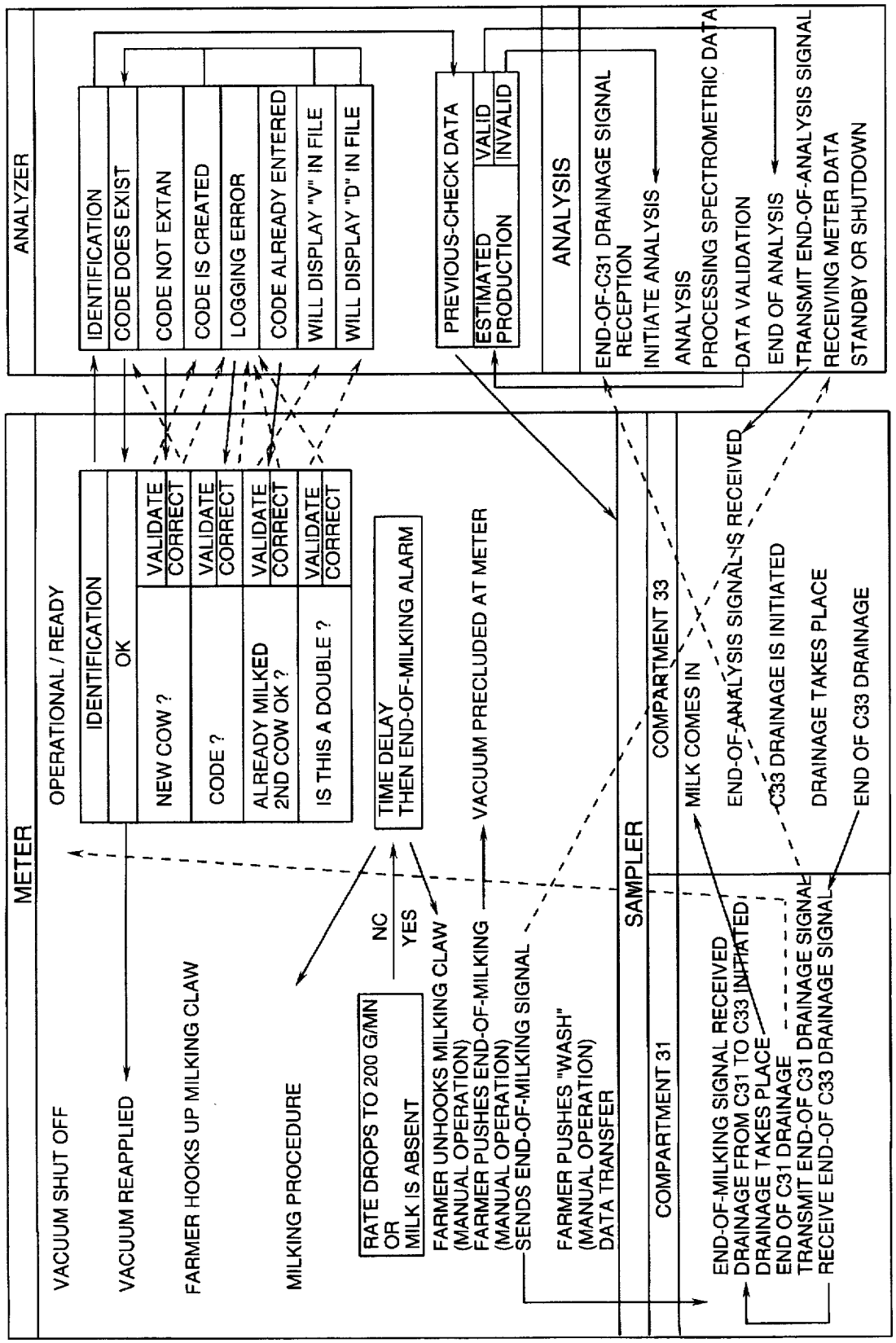
FIG. 5  FULLY AUTOMATED INTERACTIONS

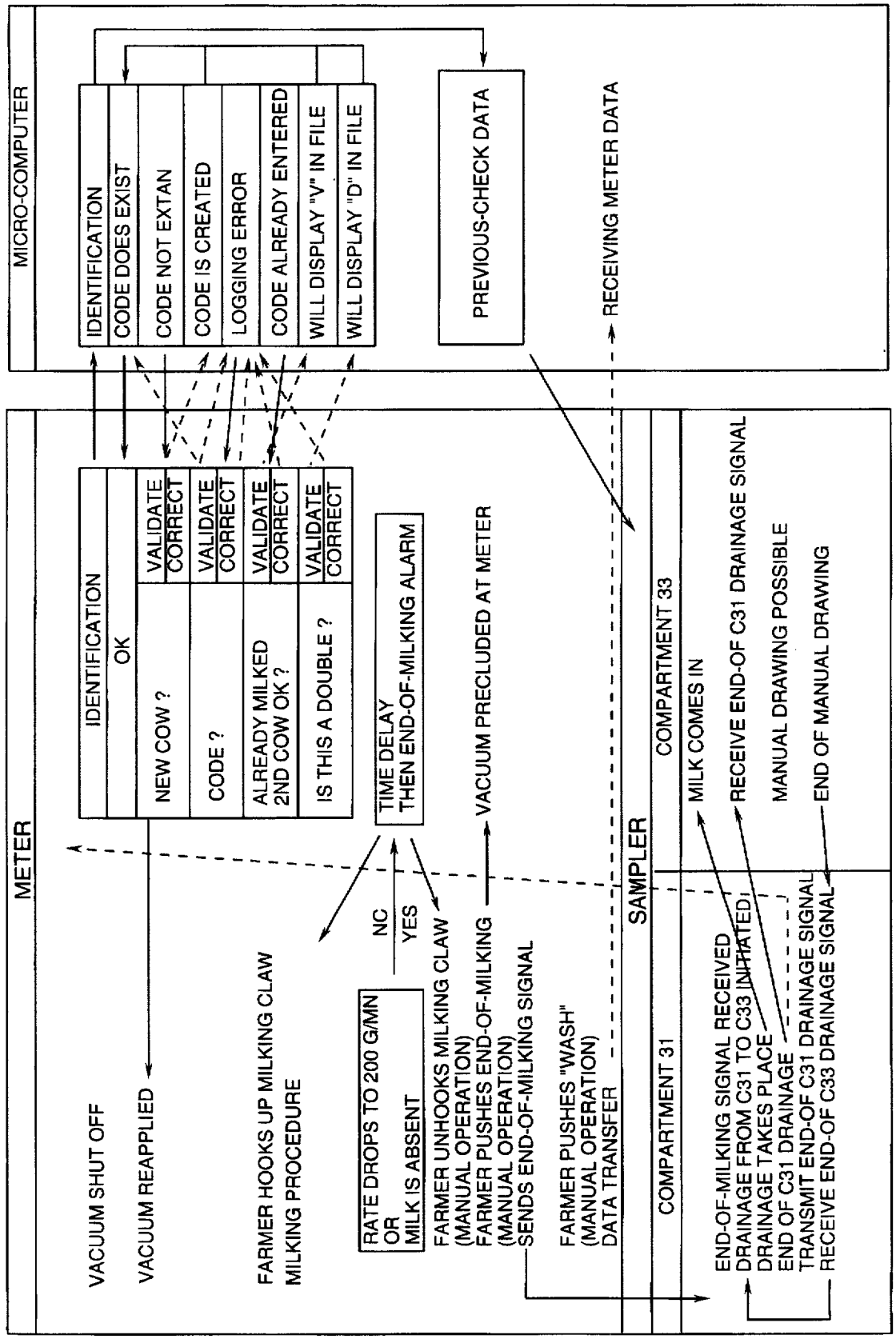
FIG. 6A SEMI-AUTOMATED INTERACTIONS

SEMI-AUTOMATED INTERACTIONS

SYSTEM AND METHOD FOR MONITORING AND CONTROLLING MILK PRODUCTION AT DAIRY FARMS

BACKGROUND

While dairy farming is by now a centuries old business, the economic realities of modern life, as well as the governmental requirements for sanitary milk production and handling and qualitative control of milk to be publicly marketed, provide additional challenges for dairy farmers. The quantity and quality of milk produced on a dairy farm of course originates with the quantity and quality of milk produced by each dairy animal, whether it be cow, goat, ewe, or other milk producing animal. Information concerning the quantity and quality of milk produced by each dairy animal, and understanding and management of that information, can provide dairy farmers with useful information with which to better manage the operation of a modern dairy farm, improve herd selection, prevent illness and increase profits.

Dairy control agents or officials exist in all developed countries. In the U.S.A. they belong to Dairy Herd Improvement Association, Inc. (D.H.I.A.) They may belong to professional groups or associations or to government administrations depending on how the dairy profession is organized in a specific country. Such officials can provide certified milk control data.

In general, in all developed countries, dairy control agents temporarily install their calibrated milk meters, from which they make a proportional sample. This sample is obtained by mechanical and manual means. Then the samples are bottled and labelled for transportation to a district laboratory where they are analyzed the day after, sometimes 2 days to as many as 8 days, after sampling actually occurs. The laboratory returns the results of the analysis and the bottles are washed and re-used. In practice the results are returned from the laboratory about one week after the analysis, and evaluated by the dairy control agent about 10 days, or more frequently about one month, following sample collection at the farm.

BRIEF SUMMARY OF THE INVENTION

The present invention is intended to provide a system for greatly improving milk quality control by milk control agents or officials and to reduce costs, the system being in compliance with the guidelines of the International Committee for Animal Recording (ICAR). It is also intended to provide an inviolable, transportable and automated control system. It is also intended to improve the ability of dairy farmers to monitor and control milk production at dairy farms. It is also intended to obtain certified data from milk control offices.

It is a further object to provide real-time instantaneous analysis of milk from each dairy animal, i.e., any domesticated milk producing animal, at an individual dairy farm, thereby largely eliminating dangers of pre-analytical errors due to poor or confused milk samples, or degradation of samples during shipping and storage before analysis.

It is a further object to provide immediately available test results on milk samples thereby permitting immediate remedial steps to improve milk quality.

Ultimately it is still a further object of the present invention to provide a system of organizing information by which the desirable genetic make-up of individual dairy animals of a dairy herd may be improved over time.

The advantageous system of the present invention for monitoring and controlling milk production at a dairy farm, includes the use of a linked system of computers and data input devices to provide a system for identifying each dairy animal with a unique alpha and/or numeric code with a validation system for checking and confirming that the animal code exists in the herd data base, that there are no code duplicators and that the corresponding animal was not already milked during the current session, measuring the individual quantities and coordinates of the points of the milk flow curve per animal, herd and session, sampling of milk produced by each dairy animal; and real-time instantaneous qualitative analysis of a proportional milk sample from each animal which is representative of the quality of the total milking, since the content of various constituents, like fat, vary during a milking session; collecting and organizing data derived from the quantitative and qualitative measurements concerning the milk produced by each dairy animal of a particular dairy herd, and transferring such data to a large regional data base. The present invention being for controlling and improving dairy herds, it includes the procedures to deliver temper-proof results, like the coherence test of the control session data per animal with the corresponding data from previous controls. These coherence tests include comparisons of milk flow and lactation curves, and milk production by milking time ratios. This system and its above-indicated objects are achieved by the present invention as described in greater detail below herein.

BRIEF DESCRIPTION OF THE DRAWINGS

The advantageous modular system of the present invention will be better understood by reference to the accompanying drawings, wherein:

FIG. 5 is a schematic chart showing relationships and interactions among parts and functions of one preferred embodiment of the inventive system which is intended virtually fully to automate the quantitative and qualitative analysis and management of dairy farm milk production; and FIGS. 6A and 6B are schematic charts showing relationships and interactions among parts and functions of another preferred embodiment of the inventive system which is intended partially to automate the quantitative and qualitative analysis and management of dairy farm milk production.

DETAILED DESCRIPTION

Figure 1:
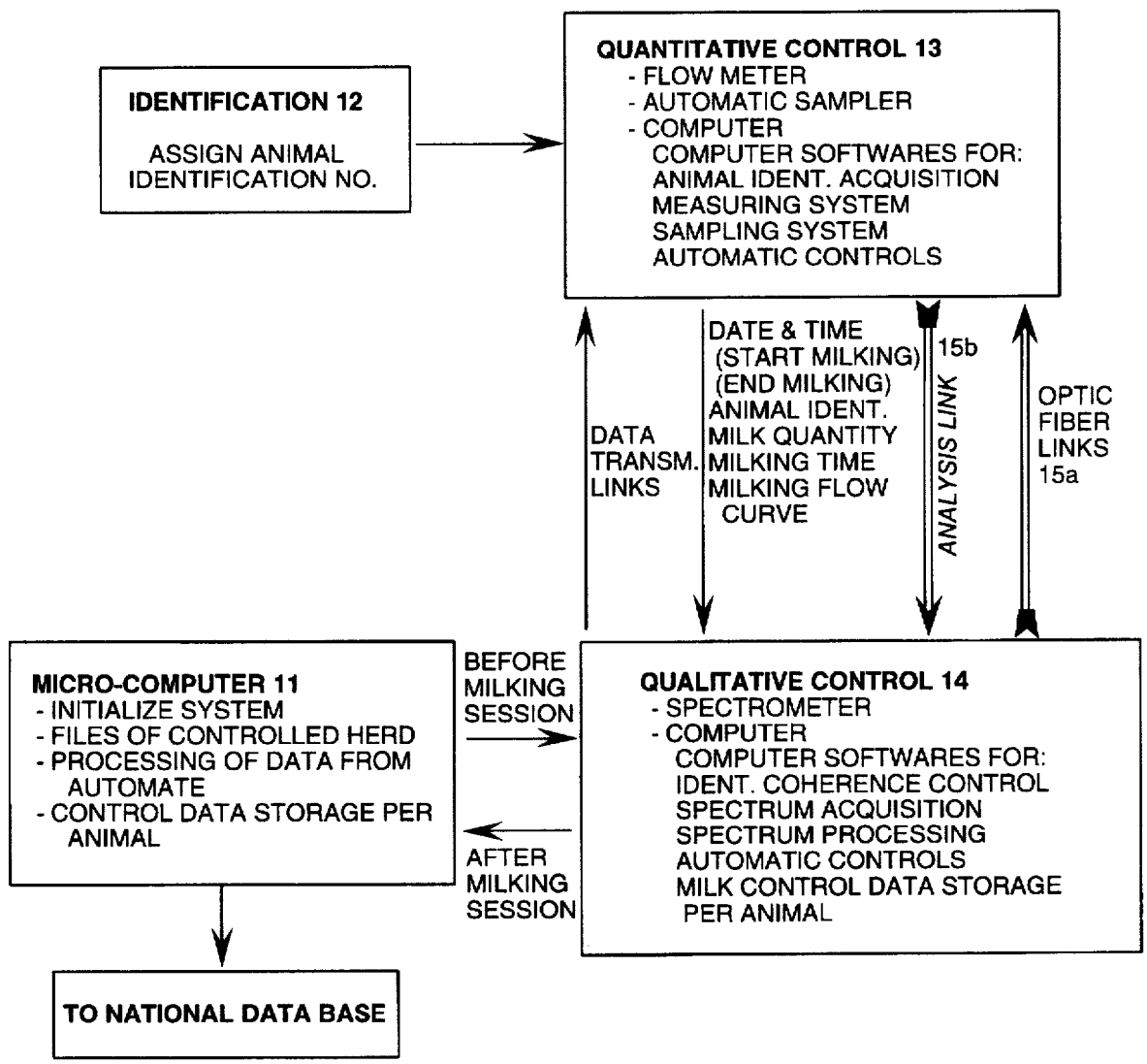
FIG. 1 is a schematic chart showing relationships among some principal parts and functions of the fully automated mode of the inventive system.

Before describing specific preferred embodiments of the advantageous system of the present invention, it is useful to provide an overview of such embodiments to have better understanding of the system as a whole and the individual elements of the inventive system.

An initial objective of the advantageous system of the present invention was to provide a system for professional and governmental control and analysis of milk at the dairy farm site of production, which system is readily portable, sturdy, shock resistant, and easy to use, service and maintain.

The system is to provide individual identification of each dairy animal at any farm utilizing the inventive system. Such identification can typically be embodied in an alpha and/or numeric code assigned to each dairy animal. All data relating to that animal and its milk production are then always accompanied by the specific animal's unique alpha/numeric code identifier, the code of the dairy herd and the milk flow meter code.

Such individual codes may be monitored by any one of several monitoring or data-logging techniques. However, desired techniques for this purpose including manually inputting the code and data into the milk meter's memory if the meters are connected, the milk meter's memory and the analyzer's memory if not, by keyboard inputting, or automatically inputting data accompanied by an individual animal code by having such data transmitted by radio transponder to a receiver at the memory of the milk meter.

For the purpose of measuring quantitative production of milk by each dairy animal and the rate of production by each animal, an electronic flowmeter or milk meter capable of measuring instantaneous flow rates is used, which also can measure and record the total quantity of milk produced during each milking session and each control period, usually each 24 hours, by each animal. This data can be organized as desired. For example, it may be organized and presented as a milk productivity graph or curve for each animal, each herd, each farm, each milking session or the like.

Additionally, the system of the present invention provides very significant advantages with respect to automatic sampling during milking of an individual dairy animal, as well as the capability of instantaneous analysis of a milk sample taken at any time during milking of an individual dairy animal. The milk meter is designed to generate automatically, continuously during the milking, a proportional milk sample which is representative of the average quality of the total milk produced during the milking of every individual animal, which sample will be analyzed at the end of the milking session of the animal after a milking completion signal is sent. In fully automatic mode, the sample is not individualized and cannot be modified.

The desired qualitative analysis of a milk sample can be carried out by infrared spectrometry through a probe present in the analysis compartment of each milk meter and connected to a spectrometer analyzer. The probes are on line with the analyzer. Light emitted by the analyzer goes to the probe through an optic fiber and comes back from the probe to the analyzer through another optic fiber or is converted into electronic signals which are transmitted to the analyzer through an electronic conduit. It is in the analyzer that the reflected or transflective beam is analyzed and converted into numeric data.

At the end of each milking session, the milk meter automatically sends a signal to the analyzer which then starts the analysis. Information from the probe can be instantaneously transmitted to the spectrometer, and the spectrometer analysis data are instantaneously available. The results of this analysis are immediately stored in memory and available on a computer screen or printer, thereby providing the basis for instantaneous management of milk quality during or immediately after milking of each individual dairy animal. These data can also be transferred by modem to the national files at the end of the control session, specially for the Genetical Indexation.

Not only milk control authorities and farmers are interested in such a system but also sanitary control authorities, genetic authorities and agricultural researchers, and the like, who will be able to collect a considerable amount of information and comparable statistics about the season, geographic area, breed, and food influences on milk quality and quantity. Dairy product industries are also interested because better and faster control will increase their confidence in the average quality of milk, and the ability of farmers to bring faster solutions to sanitary problems, since the system is capable of measuring the amount of leucocytes present in the milk of each and every animal. The system is designed for measuring every dairy animal and every milking with respect to milk flow curve, total milk quantity delivered, fat content, protein content, leucocyte content, casein content, lactose content, urea content, start time and duration of milking, and all other components which can be analyzed by infrared spectrometry. The system described herein fulfills the regulations of the International Committee for Animal Recording.

In actual practice applicants devised a milk meter for use in the system of the present invention, which milk meter comprises four primary modules, namely a weighing system, a sampling system, an analysis compartment, and an electronic control memory system.

One of the difficulties in measuring milk production particularly during or immediately after milking, is the air content of fresh milk which produces a significant foam volume and variations in density between commencement of milking and completion of milking. In order to overcome that problem applicants found that continuously weighing milk during production and at the completion of the milking session for each animal provides an approach which is substantially unaffected by the air content and variations in volume and density caused by air content. The weighing system comprises at least two containers, each of which has an electronic weight sensor or scale associated therewith. Such containers are also associated with a filling and emptying system which is capable of instantaneous very rapid switching to avoid interruption of continuous milking of the individual dairy animal producing the milk being analyzed. In the preferred system where two containers are each associated with electronic weight sensors, the fast switching valve or distributor is maintained in its open position during the filling operation, or emptying operation, of one of the two containers, and then is capable of rotating almost instantaneously to a second position in which the second container is filled and the first container is emptied through hoses associated with the fast switching valve.

The sampling system comprises a static, pitot tube-like device located in a milk flow line and operates based on the difference between the dynamic pressure of milk flowing in that line and the static pressure within the device. The sampling system is based in a milk flow line located in the milk meter downstream from the weighing system described above. This sampling system gives the milk meter the ability to continuously sample a proportionate part of the milk passing through the meter, typically about 2% of the milk production, and the continuously sampled portion of the milk is accumulated as a cumulative sample of the milk produced from an individual dairy animal during a single milking session. At the conclusion of a milking session for an individual dairy animal this cumulative sample is conveyed to a sample compartment within the milk meter where it is analyzed in the fully automated modes. In the manual or semi-automated modes a fixed volume test sample is removed for qualitative analysis.

The analysis compartment typically contains the optical probe and an agitator, or alternatively is closely associated with the optical probe which is outside the analysis compartment and milk meter, and to and from which a milk sample from within the milk meter is circulated for qualitative analysis. Such a circulation system typically involves pumping a sample of milk from the milk flow meter to and from the exterior optical probe. Two configurations are envisaged to collect the optical signals. In the first, an optical fiber conveys the light having passed through the milk to the analyzer. In the second, a light detector is placed in the milk sample circulation and transmits electronic signals to the analyzer. The analysis compartment is not only a separate compartment, but is also separately operable vis-a-vis other portions of the milk meter and system generally, and this separate operability facilitates faster milking and analysis operations since analysis can proceed even if the milk meter has been activated for metering the milk production of a different individual dairy animal from the one which produced the sample to analyzed.

The electronic control and memory system of the milk meter includes a microprocessor, keyboard, RAM memory, magnetic memory and interfaces among its various components. This system is directly on line with the electronic weight sensors causes the switching valve to change position when the weight of the container being filled reaches a maximum for which it has been designed, or receives milk for a maximum filling time. The electronic control and memory system also ensures proper signal acquisition from the automatic identification system, and ensures accurate storage of codes and other data. The memory accurately stores animal codes entered at the keyboard. The list of the herd animals is previously entered in the memory of the meter with their codes. These things typically occur when the system control and memory means is connected to the milk meter and to the qualitative analyzer.

The control system also calculates milk production per individual dairy animal by adding the weight per unit time data produced by the quantitative measuring system. Then the system records in the memory data from each milking session of each individual dairy animal associating with that dairy animal's unique code the quantity of milk produced, the start time, duration of milking and quantities of milk produced per unit of time throughout that milking session. Where applicable, appropriate data are also transferred from the control system to the qualitative analyzer. The control system also monitors milk flow rate throughout a milking session, and indicates milking completion when the flow rate decreases below the minimum milk production rate generally accepted for the species of dairy animal being milked. The analyzer comprises an optical multiplexer, an infrared spectrum analyzer, and an internal computer for the mathematical treatment of the data from the spectrum analysis and the control of all other operations, like autotest, failure diagnosis, data collection from the milk meters memories and the microcomputer. It includes also a keyboard, optical and electronical connectors.

The various components or modules of the overall system i.e., identification system, milk meters, analyzer and micro-computer can operate independently, or connected by twos, by threes or altogether by one of the various means available, including those discussed above herein, and the operation of each portion of the system is coordinated by appropriate software permitting the various modules of the system to interact appropriately to achieve the desired analytical and data processing results. When all the milk flow meters are connected as a network, in the fully automatic mode the whole system may be monitored by the analyzer or by the microcomputer in the semiautomatic mode, according to the configuration chosen by the local control officers. The computer is used only to input data into the milk meters and the analyzer memories before starting the control session. In semi-automatic mode it may also be used to perform the identification checking and validation, being connected directly to the milk meters, and to collect and validate the new data after the end of the control session. The specific data processing is of course the function of appropriate software for the components of the system, milk meters, analyzer and computer used. While those skilled in the art may choose to formulate such software in a variety of different modes and sequences, generally, such software should be capable of performing the functions indicated in this specification.

Figure 2:
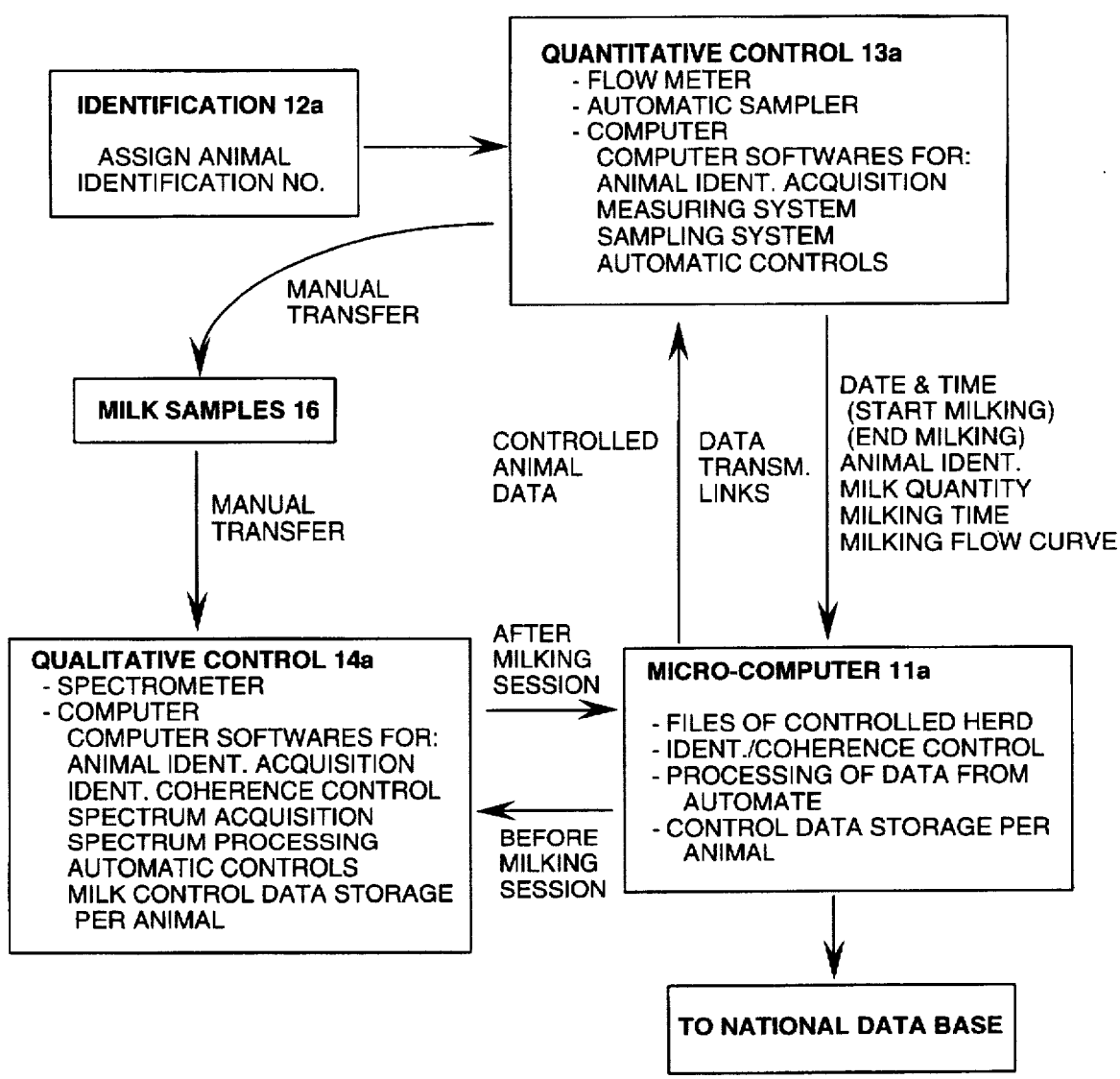
FIG. 2 is a schematic chart showing relationships among some principal parts and functions of the semi-automated mode of the inventive system.

The foregoing overview of the system of the present invention can also be understood in relation to FIGS. 1 and 2, schematic diagrams of some of the modules and functions of the system of the present invention. FIG. 1 schematically illustrates a fully automated system. Upon installation of the system at the farm, the micro-computer 11 is linked to a quality control module 14 for transferring to the combination of the modules of the system the information necessary to its successful functioning. It includes the dairy herd or farm data with the list of that herd or farm's dairy animals, their codes and associated statistics. The micro-computer 11 does not remain linked to the system during the control operations. During the control three modules remain at the farm: a module 12 for individual identification of the dairy animals linked to the sampling module and the quantitative control 13 of the production of each identified dairy animal which is also linked to the qualitative control 14. In the fully automatic mode, the animal identification code is transmitted to the analyzer as soon as it is registered at the milk meter. The analyzer includes software for checking identification validity. The coherence of the identification and associated data is ensured by a system described elsewhere herein. At the conclusion of the milk control operations, the micro-computer is the new link to the quality control module 14 for collecting and holding the results of the identification modules 12 associated with the quantitative control modules 13 and with the qualitative control modules 14. The micro-computer also collects the milk flow and the milk flow curves per animal, and makes the coherence tests before the validation of all the data and their transmission to the genetic data base. The coherence test for each individual animal includes a comparison between the milking data of previous sessions, production, milk flow curve, and the like, and those obtained in the session in course, ensuring that any animal identification error or other mis-matching of data with originating animal is avoided or duly marked with a duplication or error warning.

The micro-computer 11 includes programs for processing the various types and individual items of data received from the other modules linked to the computer, and these data processing techniques and programs are generally indicated in FIG. 1. Additionally, arrows in FIG. 1 generally indicate the existence of numerous computer links and interfaces between individual dairy animals or data gathering or processing modules associated with individual dairy animals or into which data accompanied by the alpha/numeric identifying code of individual dairy animals exists and from and to which data including possible error signal is transmitted to and received from other modules of the system, particularly including the micro-computer. Also, as indicated, certain communication links between the automatic sampler and the qualitative control spectrometer are optic fiber links 15. Such links may be any useful two-way optical transmission devices, optical fiber cables being a preferred example. The information returned to the analyzer 15b may be conveyed through optical fiber cable or electronic transmission according to the configuration chosen.

FIG. 2 schematically illustrates a semi-automated system having many, but not all, of the elements, functions and advantages of a fully automated system. For example, it is readily apparent that there are no optic fiber links in this embodiment, and milk samples 16 are manually transferred by milk control officers to avoid any fraud from the sampler at the flowmeter in 13a to the separate spectrometers in 14a.

The milk sample, typically a minimum volume of 8 mL, is manually transferred to a special compartment for viewing by the analyzer. The dairy control agent keyboards in the animal code for the milk to be analyzed. Thus there is control of the validity of the code according to a procedure described in the present invention. If the identification is good, the analyzer evacuates the sample of milk toward the optic probe. When the analysis is complete, the analyzer evacuates the milk sample toward a pail or flask for that purpose outside and separate from the analyzer. In no case is the micro-computer 11a operating as a link between the meter and the analyzer. The schematic drawing effectively indicates a micro-computer 11a link to the milk meter 13a to collect the quantitative control data. Furthermore the micro-computer 11a will be linked to the analyzer 14a to collect qualitative control data and to validate the identification code entries in the milk meters. The milk meter data and the analyzer data are linked in the micro-computer by means of the identification codes of the dairy animals. After having collected the data related to the control session the computer can test their coherence with previous data per dairy herd, dairy animal, and milking session.

More specifically, the advantageous system of the present invention makes use of two types of modules or systems for entry, collection or transmission of initial data. The first is a data input keyboard associated with the electronics of each milk flowmeter connected to each milking machine or claw. The second is a transponder physically associated with each animal and capable of transmitting a radio code in response to receipt of a polling pulse from a data collection receiver. Similarly, the emitter/receiver may be temporarily connectable directly to the electronic system of the milk meter so that data can be directly transmitted from the animal to the memory of the milk meter which makes possible the validation of identification codes by the computer.

An identification receiver is typically connected to a milk meter by RS232 type connection or infrared connection. When the milk flow meters operate separately, the control systems of the milk meter confirms that the particular animal identification code exists in the data base for the herd or farm, and whether an animal having that code has any conflicting data. If any conflicting data appear and are not corrected, the meter will accept the code and milking data but will register and transfer that milking data to the computer with a notation of duplication or error. If the milk meters form a network, a micro-computer located at the end may check identification code validity. After the analysis, the analyzer stores in its memory all the data of the milking by milk meter and animal the quantity produced, coordinates of the milk flow curve points, starting time and duration of the milking received from the milk meters plus the results of analysis by animal and by milking session. These data are transferable to a micro computer.

For the purpose of measuring the quantity of milk production, the rate of milk production and to conduct instantaneous sampling at any time during the milking of an individual dairy animal, the quantitative metering/sampling apparatus includes processor and memory which are capable of storing the previous data and statistics of the dairy herd, recording the milking times and dates, recording, rates of milk production, and calculate the coordinates of the points constituting the milk flow curve during any milking, measuring and recording overall milk production at any milking, periodically collecting and building up a sample representative of any overall milking of an individual animal; transferring all or part of a sample to an analysis container or compartment for qualitative analysis; and finally washing all of the wet parts of the flowmeter at the conclusion of the milking session of all animals. For these purposes there is one flowmeter connected to each milking machine or claw, or available at each station or stall at which an individual dairy animal is milked.

Figure 3A:
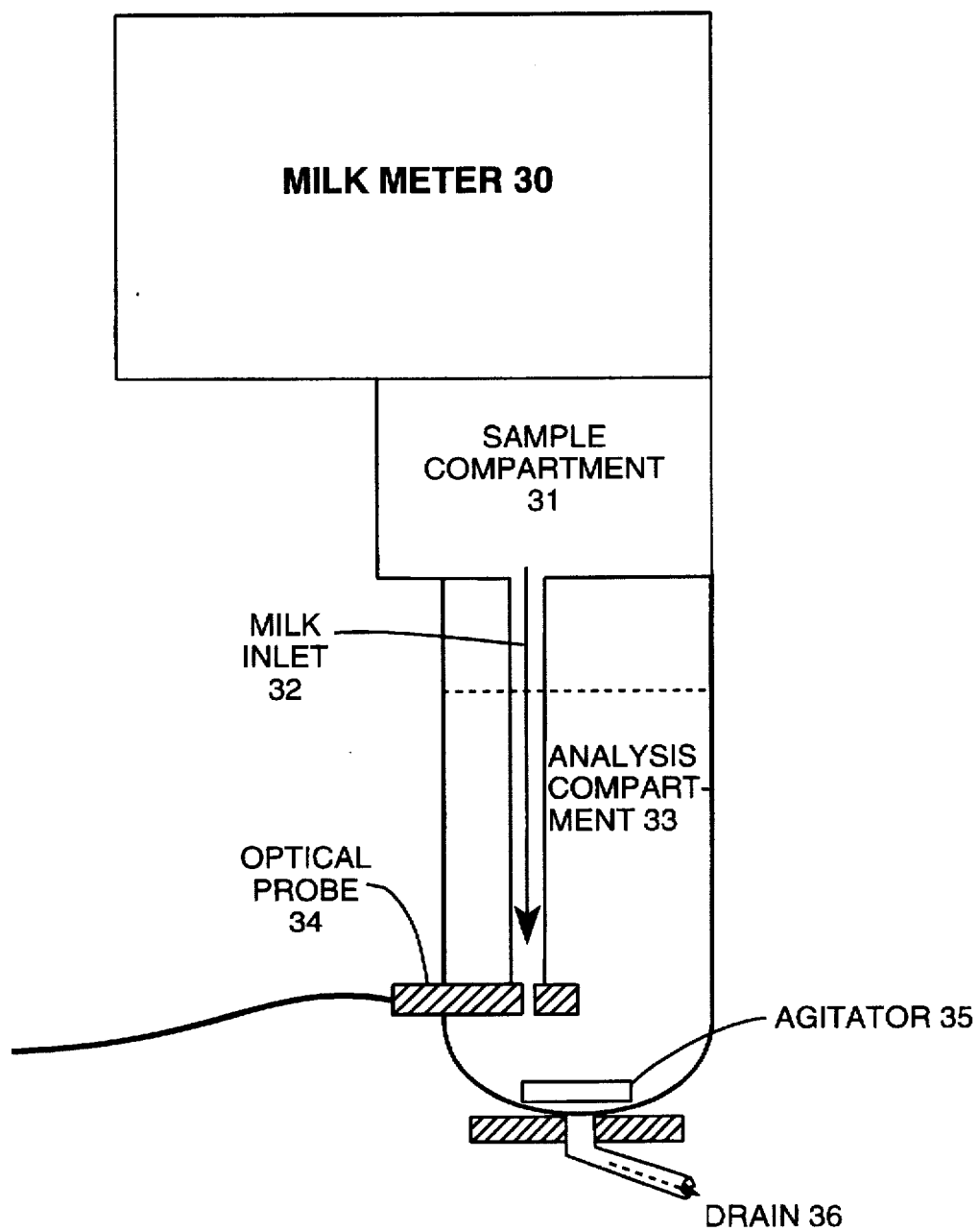
FIG. 3A is a schematic drawing showing the optical analysis probe of the system of the present invention located within the milk meter of the system in conjunction with other elements of a milk meter.
Figure 3B:
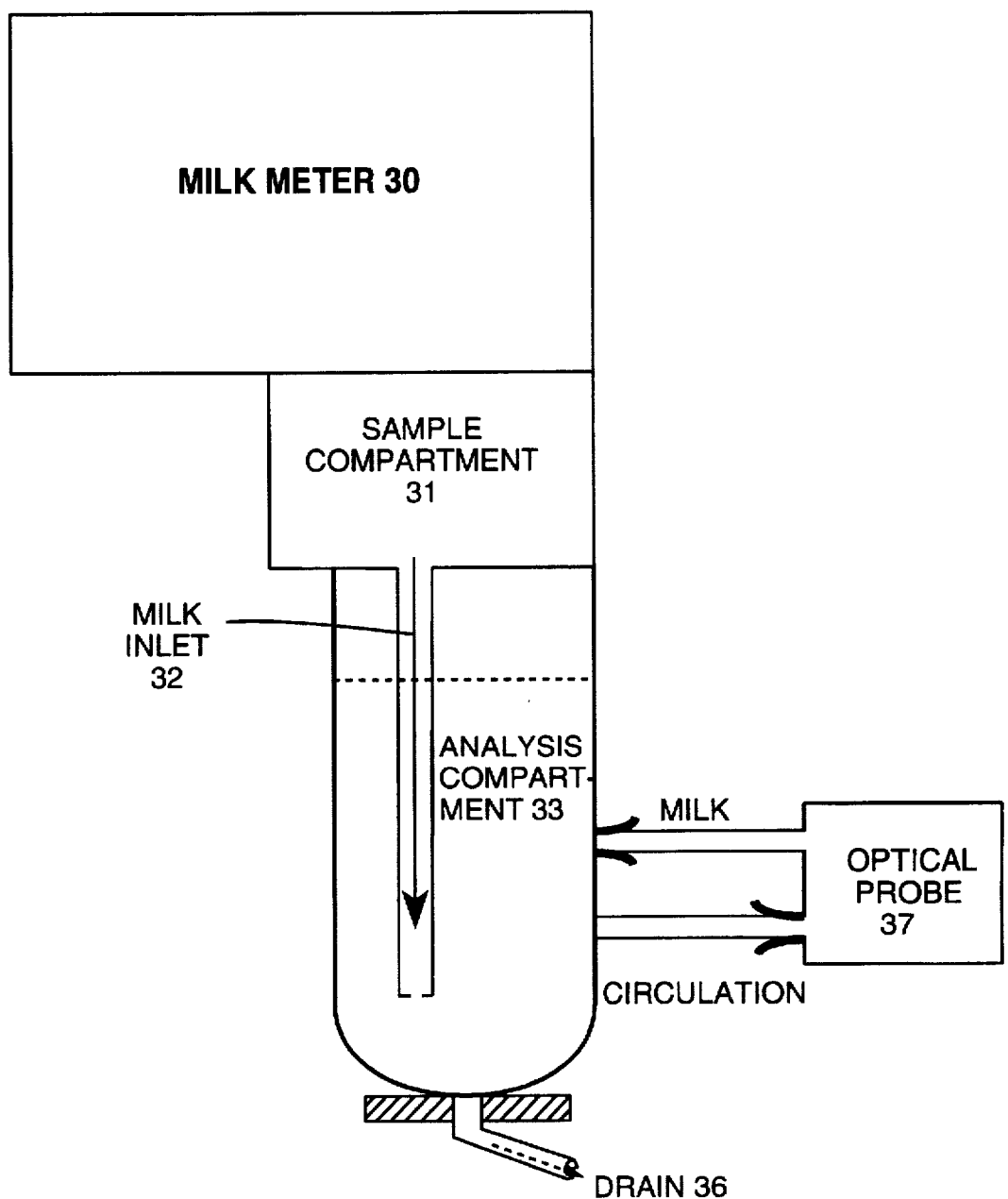
FIG. 3B is a schematic drawing showing the optical analysis probe of the system of the present invention located outside the milk meter of the system with connections for directly circulating a milk sample from within the milk meter to and from the optical analysis probe.

Qualitative analysis of a milk sample from any individual dairy animal is carried out in the advantageous system of the present invention by use of an optical probe which is capable of performing a transmissive or transmissive/reflective optical analysis of a liquid milk sample, and the detected results are transmitted to an infrared spectrometer via fiber-optic or electronic cable linkage. In the system of the present invention such an infrared spectrometer is preferably linked to a plurality of optical probes one of which is located in each of a plurality of flowmeters each associated with a milking machine or claw at an individual station or stall at which a dairy animal is milked. The optical probe may be located in an analyzing compartment or in a loop through which the milk sample circulates, and it is in that compartment that the transmissive or transflective analysis is carried out by the optical probe, the results of which are transmitted via optic fiber or electronic cable to the more centrally located infrared spectrometer. This infrared spectrometry is carried out using a range of wavelengths of infrared light appropriate for the desired results. To date, effective results have been achieved in the so-called near-infrared portion of the spectrum, although it may be possible to use other frequency ranges at least somewhat beyond the known near-infrared frequency range. FIG. 3 schematically shows the desired optical analysis test probe of the advantageous system of the present invention in conjunction with other elements of the milk meter used in such a system. As shown in FIG. 3, milk meter 30 includes sample compartment 31 in which or adjoining which is located an optical probe 34. In the embodiment illustrated in FIG. 3, a milk inlet 32 communicates to an analysis compartment 33 in which optical probe 34 is located. Analysis compartment 33 may also contain an agitator 35 to maintain homogeneity of the sample being tested. After testing is complete a milk sample exits analysis compartment 33 through drain 36. In an alternative embodiment the milk meter/probe combination may be assisted by a pump which will force or entrain milk of the sample into the optical path of the optical probe 34.

The optical test probe of the present invention may typically be used in one of two modes in the advantageous system of the present invention. In one mode, the operative tip of the optical probe is immersed in the milk sample to be analyzed, and in this embodiment it is desirable to agitate the milk in the sample being tested to ensure homogeneity of the sample. In the other mode the probe is not merely immersed into the milk sample, but rather the milk sample is supplied to the probe by a pump system which forces or entrains the milk sample to be analyzed through the optical path of the test probe. It is believed that either probes with regular or straight optical paths may be used in the advantageous system of the present invention.

In addition to rinsing external portions of the optical test probes of the present invention with water after each milking session of all dairy animals, the cleanliness of the sample compartment, milk inlet, and optical path of the test probe may be facilitated by rinsing with a portion of the milk test sample to be used before optical testing is actually conducted.

In the typical system installation where it is likely that a number of dairy animals are being milked simultaneously and thus a number of flowmeters are in simultaneous operation on a number of milking units, the infrared analyses being carried out by optical probes in several different flowmeters can be monitored simultaneously using a multi-channel optical switch to sweep the feedback from all probes in all flowmeters in simultaneous use when the feed back is optical.

In modern infrared spectrometers, the electronic spectrometer control system is capable of managing all of the spectrometer functions including spectral analysis as well as appropriately linking the spectrometer to other portions of the systems such as the flowmeters or probes located in flowmeters, as well as linking the spectrometer output or data collection memory with an appropriate data processing computer and its memory. In this way, the electronic spectrometer control can store all qualitative data relating to each dairy animal from which a collected milk sample has been analyzed associated with identification and quantitative data.

Figure 4:
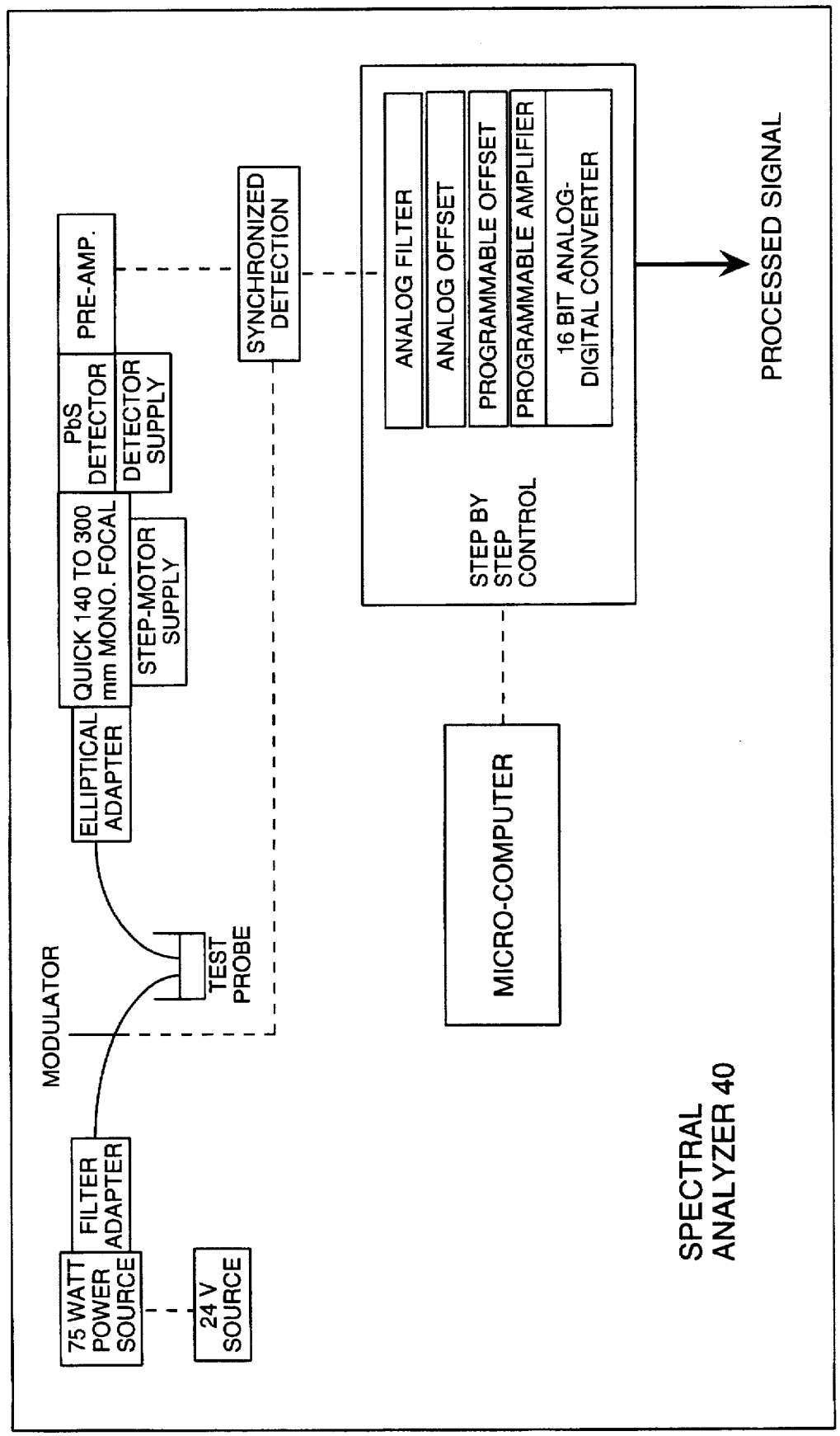
FIG. 4 is a schematic chart showing relationships among some principal parts and functions of an infrared spectrum analyzer of the systems of the present invention.

An embodiment of an infrared spectrum analyzer for use in the advantageous system of the present invention is schematically illustrated in FIG. 4. In that schematic diagram, Spectral analyzer 40 is shown in conjunction with test probe 34, the source of the input information being analyzed. The spectral analyzer 40 is operated from 24 volt and 75 watt power sources connected through appropriate electrical filter adapter equipment. A modulator connected through a detection synchronizer is connected to the test probe, and the output of the test probe is likewise connected to the detection synchronizer. The immediate output of the test probe is connected to an elliptical adapter, a quick 200 mm mono-focal driven by a step supply motor, followed by a lead sulfide (PbS) detector serviced by another supply. The output of these elements is preamplified, and it is that preamplified signal which is input to the synchronization detector for operation coordinated with the test probe modulator. The output signal then passes into step-by-step control systems controlled by a micro-computer. Those control steps include passing the output signal through an analog filter, then an analog offset then a programmable offset and then a programmable amplifier, after which the signal is processed in an analog-digital converter to result in reconstructed information in the form of a process signal indicative of the optical analysis of a particular milk sample being tested.

The system of the present invention is interactively managed and controlled by various software or software modules which are interconnected and interact through various specific linkages and interfaces. The linkages, interfaces and software modules allow automated analysis and sequencing to occur without impairing the routine work of milking a herd of dairy animals. The software modules include at least individual animal identification controlling software, flowmeter controlling software, sample controlling software, qualitative analyzer controlling software, and more general data management and data processing software for the computers or microcomputers involved.

This software and associated memories can be thought of in two groups or sets as follows: First, the software provides the capability of collecting data, organizing and managing the data and statistically processing the data collected for each identified dairy animal and each herd or dairy farm utilizing the system. Second, the system includes modules for calibrating the various quantitative and qualitative measurement systems, as well as for analyzing the stored data independently of the real-time data collection/analysis functions.

As previously indicated, the modules of the system are connected to each other through a variety of data links or interfaces, depending upon the nature of the signals or data to be transmitted and to the configuration of equipment used on individual animals. Among these linkages are electrical linkages and optical linkages, typically fiber optic cables, for transmission of optical or electronic signals, particularly those signals associated with spectrometry and the probes carrying out the detection functions which provide the input for the spectrometer. Other portions of the system, such as initial identification of individual animals may occur through linkages via radio wave transmission, by infrared remote control or infrared data transmission. Still other portions of the system may be linked by telephone cables or electrical cables, as desired or required. Particularly, return connections among various elements of the system may be electrical or optical means, as desired.

Figure 6B:
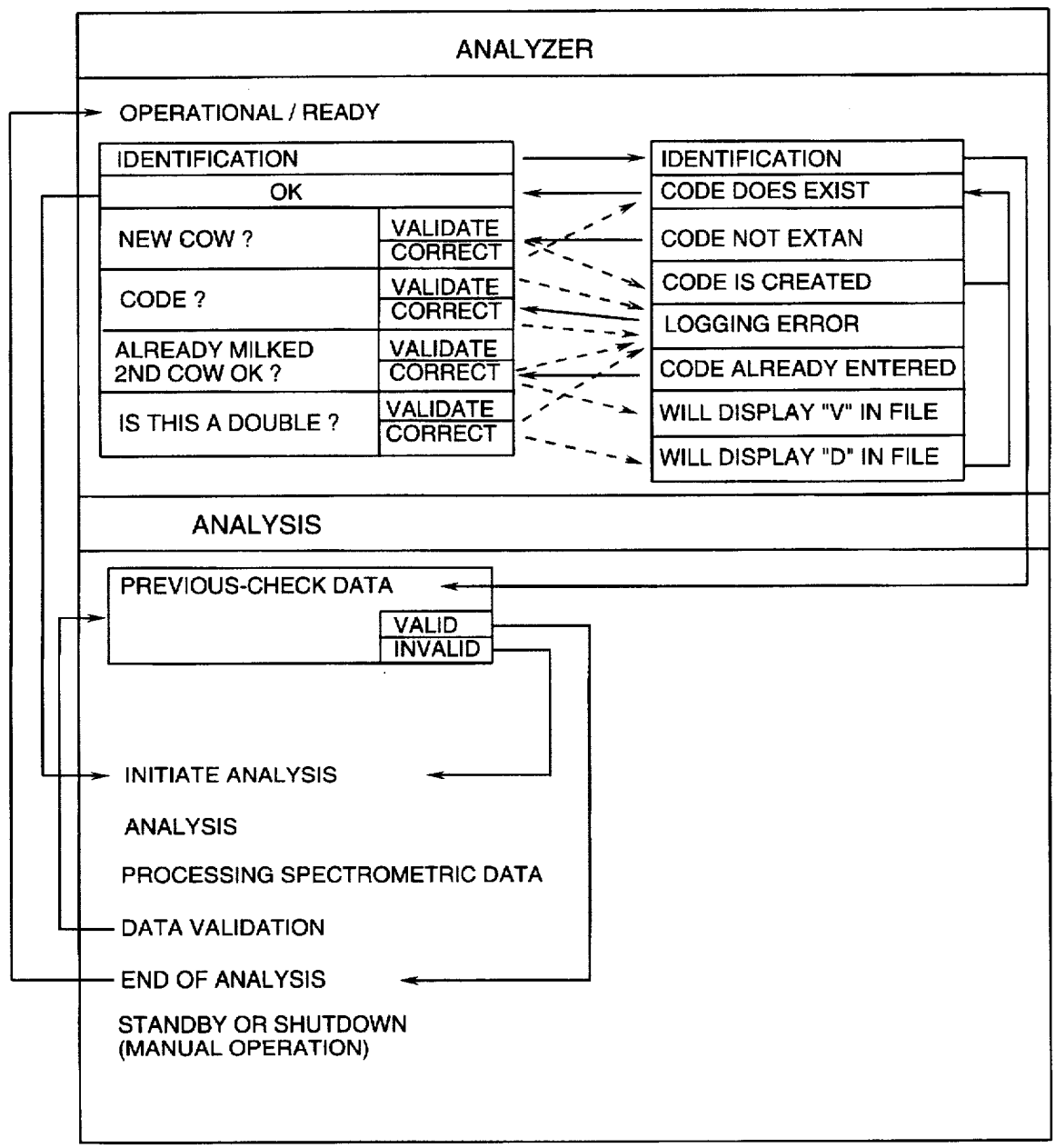

Various preferred embodiments for employing the advantageous system of the present invention are hereafter explained in conjunction with the schematic charts in FIGS. 5, 6A and 6B showing relationships and interactions among parts and functions of preferred embodiments of the inventive system.

The system interactions in a preferred, fully automated embodiment are illustrated and explained in FIG. 5 in an effort virtually fully to automate the quantitative and qualitative analysis management functions of the inventive system for monitoring and controlling milk production at dairy farms. In this fully automated system sets of quantitative and qualitative analysis modules are connected by a dual optical and electronic data-transmitting linkage. The incident beam through the incident optic fiber comprises treated or split white light emitted by a halogen lamp located in the analyzer. This white light is transmitted and reflected through the probe submerged in a milk sample, or in a flow from a milk sample, and the reflected beam coming back through a second optic fiber is altered by the absorption of part of the spectrum by the different milk constituents. This beam is then analyzed by the spectrometer along a frequency range corresponding roughly to the near infrared. The optical conduit of the linkage is capable of transmitting the infrared signal from the probe to the spectrometer for conducting the qualitative infrared spectral analysis of a milk sample when the light detection is done in the analyzer. The electronic conduit is capable of transmitting information between all the modules of the system wherein it may be stored in memory and used to set up, control and monitor the sequence of different automated monitoring steps.

EXAMPLE I

To more fully indicate the system in operation of a virtually fully automated system as illustrated in FIG. 5, the following example indicates a preferred sequence of operations using such a fully automated system:

The meters are connected to the analyzer by an electronic cable or conduit and optical cables.

1) The analyzer/meter modules are operation-ready; the milking station vacuum is maintained in the off condition at the meter to preclude the farmer from connecting his animals as long as manual or automated identification is not carried out. The vacuum is switched on by the identification of the animal to be milked.

2) When the animal identification is performed manually or automatically, a verification procedure is initiated by the analyzer/meter dialogue, as follows:

| the animal code is extant | --> | the analyzer validates; the meter becomes operational. |
| the animal code does not exist | --> | the analyzer asks: new animal?<br>--if yes, farmer validates, analyzer asks for new code, the code is created in the file, and the meter becomes operational.<br>--if no, the analyzer infers logging error and again asks for a code. |
| the code already was entered | --> | analyzer warns "already milked", analyzer asks if the second animal is ok.<br>--if yes, a "V" will display in the file next to the particular datum,<br>--if no, the analyzer inquires about any double in the herd,<br>--if yes, a D will display in the file next to the particular data,<br>--if no, the analyzer infers recording error and again asks for a code. |

The matter will be corrected when the control agent returns.

3) Identification is proper—the meter reintroduces the vacuum—the equipment is now operational.

4) The farmer connects the milking machine, i.e., milking claw, to the animal being monitored.

5) Milking takes place.

6) When the rate drops below 200 g/min or if there is no more milk circulating in the meter, a time-delay is initiated. At the end of the delay, an alarm is set off to warn the farmer milking is likely complete or there is some difficulty, for instance disconnection of the milking claw.

7) If there is a difficulty, the farmer fixes it and milking continues. If milking is complete, the farmer disconnects the animal and indicates the end of milking by pushing a specific meter key.

Thereupon the vacuum is eliminated at the meter; the farmer cannot connect the next animal as long as the milking sample is not drained into the analysis compartment.

8) When drainage into the analysis compartment is complete, the meter is again ready for use, and a signal is transmitted to the analyzer which then may analyze.

9) The analyzer initiates analysis.

10) Upon completion of analysis, the results are compared with a reference range.

If results are deviant from the reference range to which they are compared, the analyzer initiates a re-analysis. However this operation can take place only once in order not to slow milking.

If the results appear consistent, the analyzer transmits an end-of-analysis signal to the meter.

(11) The analyzer is ready for another analysis.

The meter initiates the drainage of the analysis compartment which thereby is ready for the next sample.

12) When all dairy animals have been milked, the farmer initiates a wash function on each milk meter.

This command transfers the meter data to the analyzer where they are stored. The data transfer from the milk meter may, where called for, take place following the milking of each animal rather than at the end of milking the full herd. Upon completion of data transfer, the analyzer will be in stand-by status until the next morning. The monitoring procedure applies to all milkings during a desired control period, typically each 24 hours. The analyzer should remain electrically powered to preserve the inner temperature of the apparatus. Otherwise there may be a wait of 15 to 20 min the next morning for the apparatus to warm-up to initiate the monitoring procedure, depending upon the particular apparatus actually used. Also, the analyzer should remain in standby primarily to maintain in the analyzer memory the initiation procedure adopted at analyzer set-up at the farm. In particular this procedure serves to check proper operation of the links between the milk meters and the analyzer and to calibrate the analyzer as a function of the length of the optical cables.

13) The analyzer is restarted by introduction of an identification code at the milk meter.

When the equipment is set up at the milking site, the agent feeds from his micro-computer all data necessary for the monitoring procedure to the automated equipment portion: list of monitored animals, estimates of their production allowable reference limit rates depending on herd's breed.

When the equipment is removed from the milking site, the agent retrieves the monitoring data by hooking his micro-computer to the analyzer. Thereupon he may evaluate the data and advise the farmer on his herd management. Then he may transfer the control data to the large regional data base by telephone line for genetic index calculation.

In addition to the fully automated embodiment described above herein, the system may be embodied in one or more semi-automated modes and still achieve a variety of the desired results. This other preferred embodiment of the present invention is illustrated in FIGS. 6A and 6B which are schematic charts showing relationships and interactions among parts and functions of the inventive system intended to partially automate the quantitative and qualitative analysis and management of dairy farm milk production. This semi-automated system includes both an analyzer and electronic meters although the analyzer and meter modules are no longer connected by a dual optical/electronic data-transmitting linkage.

In this system each animal being milked is identified by its alpha/numeric code identifier by entering such data in the monitoring means present during milking, and the milk sample to be analyzed from each such identified animal is manually transferred from the flowmeter to the analyzer by the dairy control agent present at the farm. The transfer and collection of flowmeter data takes place at the initial set-up and again at the time of removal of the equipment from an individual dairy farm where the semi-automated system has been at least temporarily installed. In this system any dairy control agent must connect his micro-computer to each flowmeter in order to carry out the desired operations of the overall system. Alternatively, if the individual meters are interconnected in a network format, or by infrared connection, the agent's micro-computer is connected to that network to carry out the desired overall operation. Similarly, the agent's micro-computer must be connected to the analyzer to provide, at least temporarily, a complete system.

EXAMPLE II

To better understand this type of semi-automated equipment including both an analyzer and electronic flowmeters, the following example is presented to indicate preferred operations and sequence in conjunction with the type of system illustrated in FIGS. 6A and 6B. These figures illustrate a configuration wherein the milk meters are interconnected. When they operate separately, the control system of each one is capable to perform the same tests to validate the animal identification but can only confirm that a particular animal was not already milked by this particular milk meter.

The meters no longer are connected to the analyzer. The two modules are independent from each other, being linked on demand by the dairy control agent. This agent picks up the milk at the meter and feeds it to the analyzer for the qualitative control. He enters the identifying numeral at the meter and analyzer. In this mode, identification can be monitored only at the analyzer.

1) The meter/analyzer modules are operational: the vacuum is eliminated at the meter to preclude the farmer from initiating milking of his animals as long as there is absence of manual or automated identification.

2) If identification is valid, the meter reintroduces the vacuum and the milking equipment becomes operational.

3) The farmer connects the milking claw to the animal being checked.

4) Milking proceeds.

5) When the rate drops below 200 g/min or if no more milk circulates in the meter, a time-delay sets in. At the end of the delay, an, alarm notifies the farmer of the likely end of milking or of a difficulty such as the milking claw being disconnected.

6) If a difficulty is encountered, the farmer fixes it and milking proceeds to conclusion.

If the milking is concluded the farmer disconnects the animal and confirms the end of milking by pushing a special meter key. The vacuum is then eliminated at the milk meter. The farmer cannot connect the next animal as long as the particular milk sample has not been collected by the dairy control agent.

7) Sampling is finished.

The agent replaces the full sample flask by another empty one. Be initiates a function which again readies the meter for operation.

8) The agent pours the sample into the analyzer's analysis compartment.

9) The agent enters the identifying code of the particular animal on the analyzer keyboard. The identification check then begins:

| | | |
|---|---|---|
| there is such an animal code | --> | analyzer confirms the step. |
| there is no such animal code | --> | analyzer asks: new animal? --if yes, the agent confirms, the analyzer asks for the new code, the code is created in the file, the analyzer becomes operational. --if no, analyzer deduces recording error, analyzer asks for a code again |
| the code already was entered | --> | analyzer states "already milked:, analyzer asks if second animal is ok. --if yes, a V is displayed in the file next to the affected datum. --if not, the analyzer inquires about any double in the herd. --if yes, a D will be displayed in the file next to the affected datum, --if not, the analyzer infers a recording error and again asks for a code. |

10) When identification is proper, analysis begins.

11) When the analysis is completed, the test results are compared with a reference range.

If the results appear deviant, the analyzer initiates a re-analysis. This operation may take place only once in order not to slow milking.

If the results appear consistent, the analyzer drains the sample into a flask or suitable pail.

12) The analyzer is ready for another analysis.

13) When all animals have been milked, the agent will set the analyzer on stand-by until the next morning. The monitoring procedure extends over two milkings. The analyzer should remain electrically powered to maintain the internal apparatus temperature as otherwise there would be a wait the following morning of 15 to 20 min. to raise its temperature before the monitoring procedure could be initiated.

In various embodiments of the invention a micro-computer may be connected to a plurality of milk meters to confirm individual dairy animal identification codes in the event of analyzer malfunction or in the absence of an analyzer, or in the semi-automated mode where such assistance in animal identification may be required or desired, such as where the individual farmer caring for the herd at a particular time is not familiar with the herd. In the latter case, it is desirable to include in the system a data-transmitting linkage through which individual animal identification data can be correctly input.

In other instances, where the system equipment is at least temporarily set-up at the milking site at a dairy farm, the operating agent can transmit from his micro-computer all data required for identification checking procedures. He can transfer the specific data to each milk meter, including a list of identified dairy animals and estimated or previously recorded production data. Similarly, the agent can make available to the analyzer the same list of identified animals and any limiting specifications for those animals depending upon the particular breed of the dairy herd in question. When the analytical procedures are completed and the equipment is. removed, the agent retrieves all of the data of the test procedures by connecting his micro-computer to each milk meter as well as the analyzer. The data collected from the meters and the data at the analyzer are then combined in accordance with the identifying codes at the microcomputer. In this way, the agent present at the on-site testing may evaluate the data and advise the dairy farmer on the spot concerning how to improve quality, productivity and management of his dairy herd and transfer the control data to the large regional data base by telephone line for genetic index calculation.

What is claimed is:

1. An automated method for controlling the quantity and quality of milk production at a dairy farm site regardless of the milking equipment, operable by a milk control authority for compliance with international genetic, zoological and sanitary regulations and norms, comprising using at least two modules of a modular and transportable system to carry out steps comprising:

assigning each dairy farm or herd a unique identification code;

assigning each milk producing animal in said dairy farm or herd a unique animal identification code;

providing means for measuring quantitative milk production from an individual dairy animal using a milk flow meter temporarily connectable with a milking machine for an individual dairy animal, which milk flow meter is capable of continuously weighing milk produced per unit time by an individual dairy animal during a single milking session;

providing means for qualitative analysis of the composition of a sample of milk from an individual dairy animal, which means includes an infra-red optical mode associated with said milk flow meter said infra-red probe being connected with an analyzer capable of detecting qualitative composition of milk;

providing system control and memory means in each of said qualitative measuring means and qualitative analysis means;

entering a dairy herd code into the system control means and thereby initiating control of the herd and accessing stored data for said herd and each individual dairy animal therein;

entering an individual dairy animal identification code in the system control means when the corresponding individual dairy animal is present at the milking machine, thereby activating the milk flow meter;

measuring quantitative milk production from the individual dairy animal at the milking machine using said means for measuring quantitative milk production, thereby continuously charting the milk flow curve for said animal;

qualitatively analyzing a sample of milk from the individual dairy animal at the milking machine using the infra-red optical probe associated with the milk flow meter;

detecting completion of milking session as indicated by said milk flow meter, and entering a completion of milking signal into the system control means;

indicating that the analysis can commence; and storing in the system memory data from the milking session.

2. The method of claim 1 wherein the quantitative and qualitative data for each individual dairy animal are stored for each control session, a control session comprising such data for all milking sessions for each animal during a 24-hour day.

3. The method of claim 1 wherein said flow meter and automatically creates a cumulative sample of milk representative of the quality of the entire milk production of an individual dairy animal during one milking session.

4. The method of claim 1 additionally comprising transmitting data from a milking session to a national or international data base.

5. The method of claim 1 wherein measuring quantitative milk production from an individual dairy animal occurs in real time continuously throughout a milking session of said animal.

6. The method of claim 1 wherein the infra-red optical probe is within the milk meter.

7. The method of claim 6 wherein the qualitative analysis occurs in real time during a milking session of an individual dairy animal.

8. The method of claim 6 additionally comprising agitating the milk within the milk meter to ensure homogeneity thereof.

9. The method of claim 1 wherein the infra-red optical probe is outside the milk meter and a sample of milk from within the milk meter is directly circulated to and from the probe.

10. The method of claim 9 wherein the qualitative analysis occurs in real time during a milking session of an individual dairy animal.

11. The method of claim 1 wherein qualitative analysis data is transmitted optically via optic cable from said infra-red probe to an analyzer at a site remote from the milk meter.

12. The method of claim 11 wherein the analysis data from multiple infra-red probes in operation during the milking session is transmitted to the analyzer by sweeping feedback of each of the infra-red probes.

13. The method of claim 1 wherein qualitative analysis data is transmitted electrically or telephonically from said infra-red probe to an analyzer at a site remote from the milk meter.

14. The method of claim 1 additionally comprising verifying the correspondence between the individual animal code and data from the current milking session with stored data or statistics from prior milking sessions of the same animal, thereby detecting erroneous or fraudulent data entry for any individually coded dairy animal having prior data stored in the system memory.

15. The method of claim 1 additionally comprising storing the milk flow curve data for an individual dairy animal after each milking session of said animal.

16. The method of claim 15 additionally comprising comparing the milk flow curve data from the current milking session for an individual dairy animal with stored milk flow curve data from previous milking sessions of the same animal.

17. The method of claim 1 additionally comprising storing the qualitative analysis data for an individual dairy animal after each milking session of said animal.

18. The method of claim 17 additionally comprising comparing the qualitative analysis data from the current milking session for an individual dairy animal with stored qualitative analysis data from previous milking sessions of the same animal.

19. The method of claim 1 additionally comprising monitoring for each milking session for each individual dairy animal the sequence of steps comprising milk flow rate measuring, quantitative measuring, and qualitative analysis.

20. The method of claim 1 wherein the animal code entries are checked by the memory means and if such animal code does not exist in the memory means, said system control means requests entry of a code identifying the animal.

21. The method of claim 1 wherein one of said system control means determines if a particular animal has already been milked and a milk sample analyzed during the current control session.

22. The method of claim 1 wherein the system is inviolable.

23. The method of claim 1 wherein the system is operable with a milked animal selected from the group consisting of cows, goats and ewes.

* * * * *

UNITED STATES PATENT AND TRADEMARK OFFICE
CERTIFICATE OF CORRECTION

PATENT NO. : 5,743,209
DATED : April 28, 1998
INVENTOR(S) : Serge BAZIN and Andre BECHU It is certified that error appears in the above-identified patent and that said Letters Patent is hereby corrected as shown below:

On the title page, item [57], line 1, after "modular" insert --and transportable--.

Column 6, line 7, change "semiautomatic" to --semi-automatic--.

Column 15, line 37, change "qualitative" to --quantitative--.

Signed and Sealed this

Fourth Day of August, 1998

Attest:

BRUCE LEHMAN

Attesting Officer

Commissioner of Patents and Trademarks